United States Patent [19]
Goldschmidt

[11] Patent Number: 5,154,122
[45] Date of Patent: Oct. 13, 1992

[54] SHIPPING DEVICE FOR SUSPENDED PIECE GOODS

[76] Inventor: Sol Goldschmidt, Katharinenweg 6, CH-8002, Zurich, Switzerland

[21] Appl. No.: 602,151

[22] Filed: Oct. 22, 1990

[30] Foreign Application Priority Data

Oct. 20, 1989 [DE] Fed. Rep. of Germany ....... 3934994

[51] Int. Cl.⁵ ...................... B61K 01/12; B61B 03/02
[52] U.S. Cl. ........................................ 104/93; 104/18; 105/150
[58] Field of Search .................. 104/18, 92, 93, 106, 104/111, 115; 105/150, 152, 153

[56] References Cited

U.S. PATENT DOCUMENTS

| | | | |
|---|---|---|---|
| 841,579 | 1/1907 | Ewart et al. | 105/150 |
| 995,239 | 6/1911 | Ewart et al. | 105/150 |
| 1,195,732 | 8/1916 | Riblet | 105/152 |
| 1,727,547 | 9/1929 | Knoll | 104/93 |
| 2,404,885 | 7/1946 | Pile | 104/93 |
| 2,491,300 | 12/1949 | Condit | 104/91 |
| 2,567,573 | 9/1951 | Morris | 105/150 |
| 2,609,083 | 9/1952 | Leach | 104/93 |
| 2,627,819 | 2/1953 | Finkbeiner et al. | 105/150 |
| 3,929,076 | 12/1975 | McRae, Jr. et al. | 104/18 |

FOREIGN PATENT DOCUMENTS

| | | |
|---|---|---|
| 0308582 | 5/1988 | European Pat. Off. |
| 1787586 | 4/1959 | Fed. Rep. of Germany |
| 1852793 | 5/1962 | Fed. Rep. of Germany |

Primary Examiner—Joseph F. Peters, Jr.
Assistant Examiner—Virna Lissi Mojica
Attorney, Agent, or Firm—Peter K. Kontler

[57] ABSTRACT

A device for shipping suspensible piece goods has an elongated trolley which can travel along an overhead rail. A rod is fixed to either longitudinal end of the trolley and depends from the latter. The end of each rod remote from the trolley has an upwardly open hook-shaped portion. A carrier is removably suspended on the hook-shaped portions and has a cutout which allows goods to be suspended from the carrier. Once the carrier has been loaded, the entire shipping device can be placed in a truck for transport as a unit. A downwardly open hook-shaped element projects laterally of the carrier from the hook-shaped portion of each rod. These hook-shaped elements can be used to suspend the shipping device from a bar in the truck. Since the hook-shaped elements are located laterally of the carrier, the shipping device tilts to one side when it is suspended from the bar. The shipping device and its suspended goods then take up less room in the vertical direction thereby increasing the loading capacity of the truck.

27 Claims, 2 Drawing Sheets

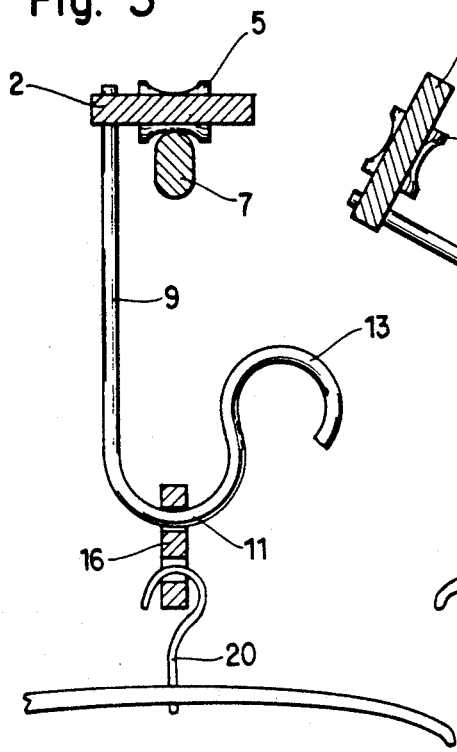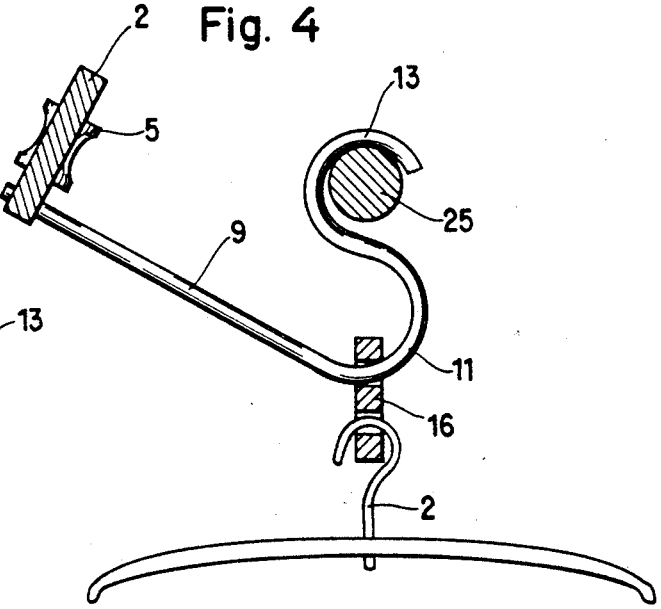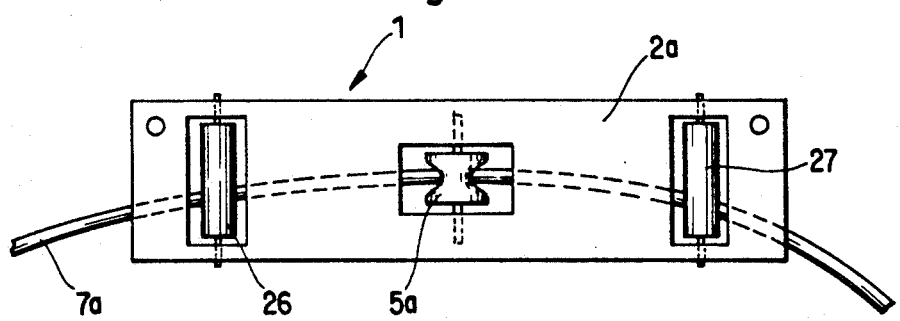

SHIPPING DEVICE FOR SUSPENDED PIECE GOODS

BACKGROUND OF THE INVENTION

The invention relates generally to a shipping device for commodities.

More particularly, the invention relates to a shipping device for suspended commodities, e.g., piece goods.

Systems for the transport of suspended commodities have a rail which is located in a transport plane above a working surface, especially at or near a ceiling or roof. Such systems further include a plurality of carriages which can be shifted along the rail.

The carriages can be constituted by a support which, for instance, is composed of simple rod-like elements. The supports are equipped with wheels or rollers arranged to roll along the rail. Load carriers, e.g., baskets, platforms and the like, which accommodate the goods to be transported can be suspended from the carriages. Alternatively, the goods can be directly suspended from the rod-like elements. In this manner, the goods can be easily and compactly transferred from one working location to another.

Carriages of the above type are widely used inside plants to move goods from storage to a working location and also between working locations.

Static, dual iron beams known as "clothing sets" have been used for many years in the delivery of clothes from manufacturer or seller to final distributor. The sets are loaded at the supplier, provided with the relevant documents and transferred to the supplier's own transporter or to an external transporter for shipment to the buyer, i.e., the distributor or wholesaler, inside or outside of the country.

Depending upon distance, distribution network and whether the final buyer or the wholesaler is inside or outside of the country, the sets are conveyed, combined, classified, sorted and temporarily stored by the transporter in a smaller or larger number of stages at consolidation, sorting and distribution centers. In most cases, these operations are performed by hand. Labor expenses are thus very high, particularly because the sets hang during the various stages and are taken down and suspended manually. For transport, moreover, the sets are assembled on suspended or travelling carriages, e.g., carriages for elevated rails as described in the European patent application no. 0 308 582, which leads to additional sorting and distribution labor.

Furthermore, each set or group of sets must be provided with an address, a delivery certificate and, if necessary, customs documents.

Another drawback of the sets is that they take up a large amount of space during transport in motor vehicles when the clothes are left on the sets. Thus, significant loading capacity is lost in the vertical direction.

The clothes may be combined into bundles for shipment without the sets. Although less space is taken up during transport, these bundles also require documents. Furthermore, the bundles must again undergo consolidation and/or distribution in appropriate centers and, upon transfer from one stage to another, are removed from one carriage and suspended on a new carriage by hand. This procedure is even more labor-intensive than that with the sets.

Sets do simplify handling somewhat. However, as already mentioned, when the goods remain on the sets during transport, a disproportionately and unnecessarily large amount of space is required for transport. Additional drawbacks of sets, as well as drawbacks associated with bundles, are as follows:

At each operating stage of the generally long distance from manufacturer or seller to final distributor, the goods must be provided with new identification in order to proceed to the next stage. This creates a large expense and sometimes results in a loss of time.

Moreover, the sets and the bundles of individual clothing items, as well as the accessories and organization required for the same, are not suited for automation so that the advantages of automation cannot be achieved.

The following further drawbacks are caused by the repeated manual manipulations during transfer, sorting and identification of the goods: time delays, improper disposition, theft and losses, increased costs and a possible need for additional carriages.

SUMMARY OF THE INVENTION

It is an object of the invention to provide a shipping device which allows the transport of suspended commodities between different processing stages to be largely mechanized or automated.

Another object of the invention is to provide a shipping device which enables the handling of suspended commodities during sorting and other processing stages to be largely mechanized or automated.

A further object of the invention is to provide a shipping device which permits a large degree of mechanization or automation in the handling of suspended commodities to be achieved relatively inexpensively.

An additional object of the invention is to provide a shipping device which allows a group of suspended commodities to be transferred from supplier to buyer as a unit.

It is also an object of the invention to provide a shipping device which makes it possible to make more efficient use of space during transport of suspended commodities from one processing stage to another.

Still another object of the invention is to provide a method which enables suspended commodities to be handled with greater efficiency.

The preceding objects, as well as others which will become apparent as the description proceeds, are achieved by the invention.

One aspect of the invention resides in a shipping device for suspensible commodities such as, for instance, piece goods. The device comprises a trolley having means, e.g., one or more rollers, for displacement of the trolley along an elevated rail and a carrier having means for suspending commodities therefrom. The device further comprises means for releasably connecting the trolley and the carrier to one another and supporting the carrier and the trolley. The connecting and supporting means includes holding means laterally of the suspending means.

The holding means may comprise a pair of hook-shaped holding elements. It is preferred for the holding means to be disposed in the region of the carrier.

By situating the holding means laterally of the suspending means, the holding means is located to one side of the loading line or plane, that is, the line or plane where the forces exerted by the suspended commodities act.

In accordance with the invention, the shipping device is designed as a carriage which can travel along an elevated rail, on the one hand, and can be statically suspended, e.g., in a truck, via the lateral holding means, on the other hand. The design of the shipping device as a carriage makes it possible to achieve largely mechanized handling of the commodities on the device during all processing stages, namely, the processing stages which are carried out at the manufacturer or supplier, at the intermediate distributors who rearrange, divide and temporarily store the commodities and at the final distributor such as, for instance, a department store, which may have a mechanized storage facility. At the same time, the design of the shipping device with the lateral holding means provides the advantage that the center of gravity of the device and its commodities is shifted when the device is suspended on the holding means during transport in a truck. By appropriate shifting of the center of gravity, the amount of space taken up by the device and its commodities in the vertical direction is reduced.

A further advantage flows from the releasable connection between the carrier and the trolley. This allows the carrier, together with the commodities suspended therefrom, to be removed from the trolley if a storage facility, e.g., the storage facility of a final distributor such as a warehouse, is designed for purely static storage or if the commodities must be held in readiness for pick-up from a supplier after business hours.

The novel features which are considered as characteristic of the invention are set forth in particular in the appended claims. The improved shipping device itself, however, both as to its construction and its mode of operation, together with additional features and advantages thereof, will be best understood upon perusal of the following detailed description of certain specific embodiments when read in conjunction with the accompanying drawings.

BRIEF DESCRIPTION OF THE DRAWINGS

FIG. 3 is a vertical sectional view of the shipping device of FIG. 1 with the device movably suspended from an elevated rail;

FIG. 4 is a vertical sectional view of the shipping device of FIG. 1 with the device stationarily suspended from a bar; and FIG. 5 is a plan view of another embodiment of the shipping device.

DESCRIPTION OF THE PREFERRED EMBODIMENTS

Figure 1:
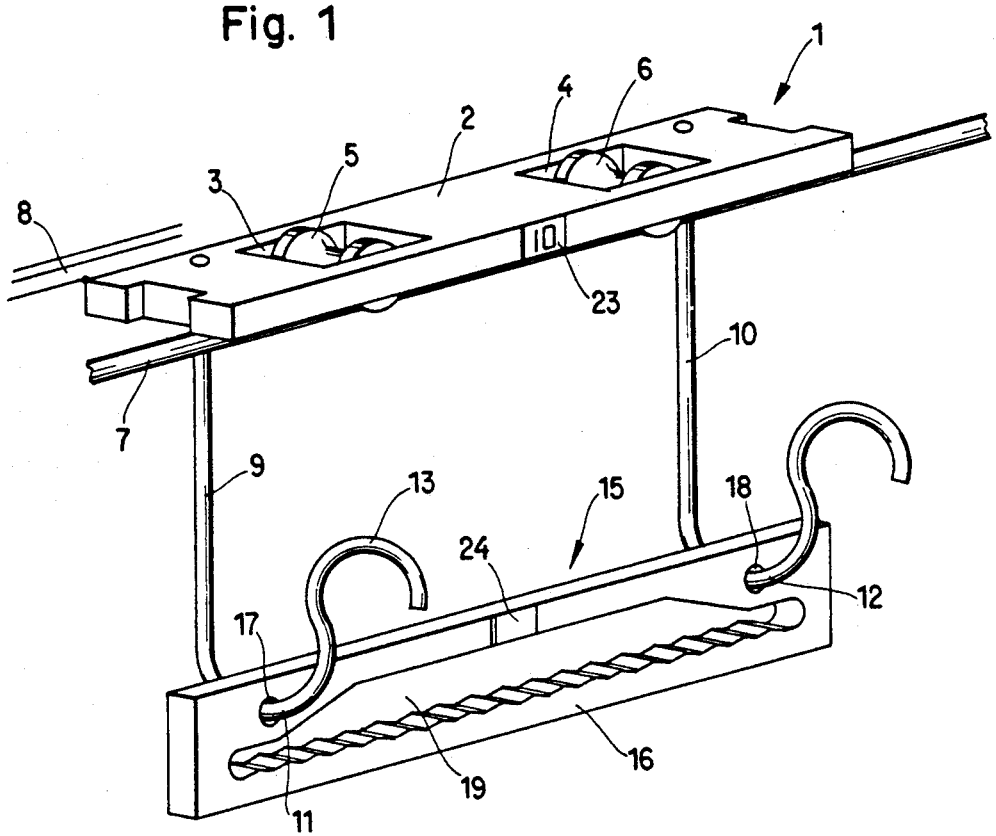
FIG. 1 is a perspective view of one embodiment of a shipping device in accordance with the invention.

FIG. 1 shows a shipping device according to the invention for the shipment of suspensible commodities such as, for instance, piece goods. The shipping device includes a trolley 1, that is, a carriage designed for travel along an elevated or overhead rail 7. The trolley 1 includes a substantially horizontal support plate 2 which is provided with a pair of cutouts 3 and 4. Rollers 5 and 6 are rotatably mounted in the cutouts 3 and 4, respectively. The rollers 5 and 6 are designed to roll on the rail 7 thereby permitting the trolley 1 to move along the rail. A drive mechanism 8 may be provided to automatically shift the trolley 1 along the rail 7.

The support plate 2 is elongated and has a generally rectangular configuration. Two connecting rods 9 and 10 are rigidly secured to the support plate 2 in the region of two corners thereof. These corners are located at opposite longitudinal ends of the support plate 2 and to the same side of its longitudinal axis, i.e., the connecting rods 9 and 10 are disposed at opposite longitudinal ends of the support plate 2 and adjacent to one of the longitudinal edges thereof. The connecting rods 9 and 10 are perpendicular to the major surfaces of the support plate 2 and extend vertically downwards from the latter. The free ends of the connecting rods 9 and 10, that is, the ends of the connecting rods 9 and 10 remote from the support plate 2, are provided with respective hook-shaped portions 11 and 12. The hook-shaped portions 11 and 12 include upwardly open curved segments which are transverse to the support plate 2 and extend through an angle of at least 180 degrees, preferably somewhat more. As mentioned above, the connecting rods 9 and 10 are located adjacent to one of the longitudinal edges of the support plate 2 and the curved segments project in a direction from this longitudinal edge towards the opposite longitudinal edge of the support plate 2. The radius of curvature of each of the curved segments is selected in such a manner that the centers of curvature of the segments are situated in approximately the same plane as the centers of the rollers 5 and 6.

Hook-shaped holding elements 13 and 14 project from the hook-shaped portions 11 and 12, respectively, and form extensions of the hook-shaped portions 11,12 and the connecting rods 9,10. The holding elements 13 and 14 are transverse to the support plate 2 and extend in the same direction as the hook-shaped portions 11 and 12. The holding elements 13 and 14 include downwardly open curved segments which extend through an angle of at least 180 degrees, preferably somewhat more. As will become clearer below, optimum utilization of space in the vertical direction, e.g., inside a truck, may be obtained by placing the holding elements 13 and 14 adjacent to the hook-shaped portions 11 and 12.

The shipping device further comprises a carrier 15 for suspensible commodities such as piece goods. The carrier 15 may include a plate 16 which is here elongated and of generally rectangular configuration. The plate 16 is provided with two openings 17 and 18 in the region of two corners thereof. These corners are located at opposite longitudinal ends of the plate 16 and to one side of its longitudinal axis. The respective holding elements 13 and 14, as well as the respective hook-shaped portions 11 and 12, are designed to pass through the openings 17 and 18 so that the carrier 15 can be suspended from the curved segments of the hook-shaped portions 11 and 12. The connecting rods 9 and 10 may be provided with catches or arresting elements in the regions of the hook-shaped portions 11 and 12 for the purpose of fixing the suspended carrier 15.

The plate 16 is further provided with an elongated cutout or opening 19 in which commodities to be transported can be suspended from the carrier 15. The commodities may, for example, be articles of clothing which are hung on hangers 20 shown in FIGS. 3 and 4.

The commodities suspended on the carrier 15 exert a force on the latter. The force acts along a line substantially coincident with the center line of the plate 16 and in a plane which is essentially parallel to the major surfaces of the plate 16 and is located substantially midway between these major surfaces. The hook-shaped holding elements 13 and 14, which are situated in the vicinity of the carrier 15, project laterally of the line of force and its plane.

The trolley 1, the carrier 15 and the connecting and supporting members 9,11,13 and 10,12,14 are preferably composed of plastic or light metal.

Figure 2:
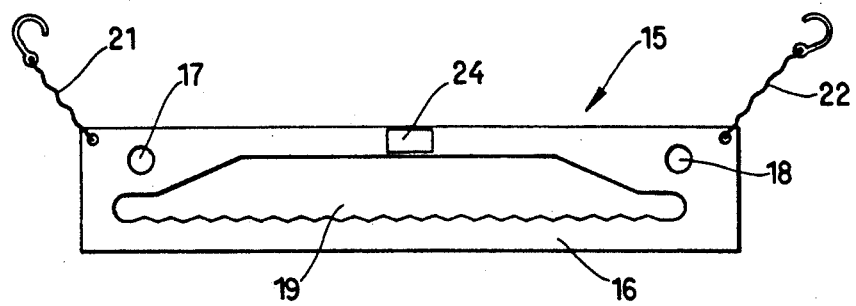
FIG. 2 is an elevational view of a carrier which may be used in the shipping device of FIG. 1.

FIG. 2 shows that the plate 16 may be provided with two hook-like suspending elements 21 and 22 in the region of two corners thereof. These corners are located at opposite longitudinal ends of the plate 16 and to one side of its longitudinal axis. The suspending elements 21 and 22 allow the carrier 15 to be used independently of the trolley 1 at work stations or storage facilities, e.g., during a preparation phase or at a final distributor. Thus, the suspending elements 21 and 22 make it possible to stationarily suspend the carrier 15 from hooks, crossbars, rails or stands. The suspending elements 21 and 22 also enable the carrier 15 to be suspended from and used with carriages other than the trolley 1.

FIGS. 1 and 2 illustrate that the trolley 1 may be provided with a data carrier or memory 23 and that the carrier 15 may be provided with a data carrier or memory 24. The data carriers 23 and 24 are preferably in the form of currentless and interchangeable modules which are readable, erasable and reprogrammable. By way of example, the data carriers 23 and 24 may be constituted by static EEPROMs or by cards with magnetic strips. The data carriers 23 and 24 make it possible to store data relating to the types of goods, the destinations of the goods and similar information. The data carriers 23 and 24 are advantageously mounted on the trolley 1 and the carrier 15 in such a manner that they can be read from externally of the trolley 1 and the carrier 15 at the various stations through which the shipping device passes during travel from the point of origin to final destination.

FIG. 3 shows the shipping device during dynamic operation. The shipping device is here suspended from the rail 7 and can be moved along the latter either manually or by means of the drive mechanism 8. This makes it possible to conveniently carry out procedures such as shifting, regrouping, rearrangement, temporary storage, etc. However, a considerable amount of space is required in the vertical direction. In a temporary storage facility, this does not pose a serious constraint because the most important considerations are convenient handling, reliability and the saving of time during handling.

The situation is different during transport between different facilities, e.g., by truck. Here, space is generally at a premium and optimum use of space is a primary consideration. FIG. 4 shows the shipping device during transport in a truck. The shipping device is stationarily suspended from a carrying rod 25 by means of the hook-shaped holding elements 13 and 14. Since the holding elements 13 and 14 project laterally of the center line of the plate 16, that is, laterally of the line or plane where the force exerted by the commodities on the carrier 15 acts, the entire shipping device tilts to one side and thus takes up less space in the vertical direction. There is adequate room laterally to accommodate tilting of the shipping device inasmuch as the lateral dimension must at least equal the relatively large width of the suspended commodities, e.g., the clothes hangers 20. The design of the shipping device accordingly makes it possible not only to manipulate an entire group of commodities, together with the shipping device, in a convenient and timesaving fashion as a unit but also to transport the commodities and the shipping device compactly.

If the trolley 1 is to travel along straight rails only, the rollers 5 and 6 may be rotatably mounted on the plate 2 in such a way that their axes of rotation have fixed positions relative to the plate 2, i.e., in such a way that the rollers 5 and 6 cannot pivot relative to the plate 2. However, if the trolley 1 is to travel along curved rails, the rollers 5 and 6 are preferably mounted on the plate 2 for pivotal movement relative to the latter. Pivotal mounting of the rollers 5 and 6 on the plate 2 is not described here because this may be accomplished using any one of several conventional designs.

FIG. 5 illustrates another simple and inexpensive embodiment of the shipping device in accordance with the invention. The trolley 1 of FIG. 5 includes a plate 2a which resembles the plate but is provided with three cutouts instead of two. Thus, the plate 2a is provided with a cutout in the region of either longitudinal end thereof and with another cutout at its center. The central cutout receives a roller 5a which is rotatably mounted on the plate 2a in such a way that the axis of rotation of the roller 5a has a fixed position relative to the plate 2a, i.e., in such a way that the roller 5a cannot pivot relative to the plate 2a. The cutouts at the two ends of the plate 2a are elongated transversely of the latter and receive respective support rollers 26 and 27 which, in contrast to the central roller 5a, have a cylindrical configuration. The cylindrical rollers 26 and 27 are again rotatably mounted on the plate 2a such that their axes of rotation have fixed positions relative to the plate 2a. The roller 5a, which is grooved like the rollers 5 and 6, serves to guide the shipping device along the curved rail 7a. On the other hand, the cylindrical rollers 26 and 27 function to stabilize the shipping device in longitudinal direction thereof. The design of FIG. 5 allows the trolley 1 to travel along a curved rail such as the rail 7a even though the rollers 5a,26,27 are not pivotable with respect to the plate 2a.

The shipping device of the invention provides a technically simple, reliable and financially attractive means for the automatic processing of suspensible commodities, e.g., clothes or the like. The advantage of simple and timesaving manipulation is ideally combined with the advantage that space can be economized during transport between different facilities or centers. Moreover, the unit consisting of the shipping device and the actual commodities can be used where a conveyor system with an elevated rail is not available. Thus, the carrier with the suspended commodities is then simply removed from the trolley.

The shipping device according to the invention can also be adjusted to the elevated or overhead conveyor systems of a wide variety of manufacturers with little work and expense. Consequently, it becomes possible, for the first time, to achieve maximum efficiency in cooperative arrangements between different facilities both nationally and internationally. This can lead to significant reductions in both delivery times and price.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. A shipping device for suspensible commodities, comprising a trolley having means for displacement of said trolley along an elevated rail; a carrier having means for suspending commodities therefrom; and means for releasably connecting said trolley to said carrier and supporting said carrier on said trolley, said connecting and supporting means including holding means laterally of said suspending means for suspending said carrier and said trolley, independently of said rail, together with commodities suspended from said carrier, and said holding means being oriented such that said trolley is in other than an upright position when said trolley is suspended by said holding means.

2. The device of claim 1, wherein said displacement means includes at least one roller.

3. The device of claim 1, wherein said holding means is disposed in the region of said carrier.

4. The device of claim 1, wherein said holding means includes a pair of hook-shaped holding elements.

5. The device of claim 1, wherein said trolley comprises a plate-like element.

6. The device of claim 5, wherein said connecting and supporting means comprises a pair of rod-like elements which are fast with said plate-like element and substantially perpendicular thereto.

7. The device of claim 6, wherein each of said rod-like elements has an end remote from said plate-like element and said ends are provided with hook-shaped portions.

8. The device of claim 1, wherein said carrier comprises a plate-like element.

9. The device of claim 8, wherein said plate-like element is provided with an opening, at least part of said connecting and supporting means being receivable in said opening and being designed to suspend said plate-like element.

10. The device of claim 1, wherein said suspending means comprises an opening in said carrier.

11. The device of claim 1, wherein said connecting and supporting means comprises a rod-like element which is fast with, and has an end remote from, said trolley, said end being provided with an arresting portion designed to hold said carrier in a predetermined position.

12. The device of claim 1, wherein said connecting and supporting means comprises a rod-like element which is fast with, and has an end remote from, said trolley, said end being provided with a hook-shaped portion, and said holding means including a hook-shaped extension of said hook-shaped portion.

13. The device of claim 1, wherein said trolley comprises plastic or a light metal.

14. The device of claim 1, wherein said carrier comprises plastic or a light metal.

15. The device of claim 1, wherein said connecting and supporting means comprises plastic or a light metal.

16. The device of claim 1, wherein said trolley is provided with a programmable and erasable, currentless memory.

17. The device of claim 16, wherein said memory is mounted on said trolley so as to be readable from outside of said trolley.

18. The device of claim 16, wherein said memory is interchangeable.

19. The device of claim 1, wherein said carrier is provided with a programmable and erasable, currentless memory.

20. The device of claim 19, wherein said memory is mounted on said carrier so as to be readable from outside of said carrier.

21. The device of claim 19, wherein said memory is interchangeable.

22. The device of claim 1, wherein said connecting and supporting means comprises mounting means for mounting said carrier on said trolley, said mounting means and holding means being of one piece.

23. The device of claim 1, wherein said trolley is elongated and has opposed longitudinal ends, said displacement means including a roller in the region of each of said ends.

24. The device of claim 23, wherein said rollers are pivotable.

25. The device of claim 1, wherein said connecting and supporting means is substantially rigid.

26. A shipping device for suspensible commodities, comprising a trolley having means for displacement of said trolley along an elevated rail; a carrier having means for suspending commodities therefrom and additional means for suspending said carrier independently of said trolley; and means for releasably connecting said trolley to said carrier and supporting said carrier on said trolley, said connecting and supporting means including holding means laterally of said suspending means for suspending said carrier and said trolley, independently of said rail together with commodities suspended from said carrier.

27. A shipping device for displacement of said trolley along an elevated rail, said trolley being elongated and having opposed longitudinal ends, and said displacement means including a roller in the region of each of said ends which is elongated transversely of said trolley and an additional roller substantially midway between said ends; a carrier having means for suspending commodities therefrom; and means for releasably connecting said trolley to said carrier and supporting said carrier on said trolley, said connecting and supporting means including holding means laterally of said suspending means for suspending said carrier and said trolley independently of said rail together with commodities suspended from said carrier.

* * * * *